US006757264B1

(12) United States Patent
Gayrard

(10) Patent No.: US 6,757,264 B1
(45) Date of Patent: Jun. 29, 2004

(54) SATELLITE COMMUNICATION SYSTEM FOR BROADCASTING AUDIO-VISUAL PROGRAMS AND MULTIMEDIA DATA

(75) Inventor: Jean-Didier Gayrard, St Agne (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/310,957

(22) Filed: May 13, 1999

(30) Foreign Application Priority Data

May 14, 1998 (FR) .............................. 98 06083

(51) Int. Cl.[7] .............................................. H04B 7/185
(52) U.S. Cl. ...................... 370/316; 370/323; 370/325; 455/427; 455/428; 455/430; 455/12.1; 455/13.3; 455/7
(58) Field of Search ................................ 370/316, 323, 370/325; 455/427, 428, 430, 12.1, 13.3, 7

(56) References Cited

U.S. PATENT DOCUMENTS

| | | | | |
|---|---|---|---|---|
| 5,712,850 A | * | 1/1998 | Elia et al. ..................... | 370/326 |
| 5,835,487 A | * | 11/1998 | Campanella ................ | 370/316 |
| 6,047,162 A | * | 4/2000 | Lazaris-Brunner et al. | 455/12.1 |
| 6,160,797 A | * | 12/2000 | Robert et al. ............... | 370/316 |
| 6,201,798 B1 | * | 3/2001 | Campanella et al. ....... | 370/326 |
| 6,240,073 B1 | * | 5/2001 | Reichman et al. .......... | 370/319 |
| 6,473,858 B1 | * | 10/2002 | Shimomura et al. ........ | 713/150 |
| 6,473,900 B1 | * | 10/2002 | Pham et al. .................. | 725/63 |
| 6,487,182 B1 | * | 11/2002 | Kitazato ...................... | 370/315 |
| 6,557,171 B1 | * | 4/2003 | Sonoda et al. .............. | 725/136 |
| 6,570,859 B1 | * | 5/2003 | Cable et al. ................. | 370/323 |
| 6,584,082 B1 | * | 6/2003 | Willis et al. ................. | 370/316 |

FOREIGN PATENT DOCUMENTS

FR      2 723 279 A1     2/1996

OTHER PUBLICATIONS

Journal of the Institution of Electronic and Radio Engineers, vol. 55, No. 10, Oct. 1985, pp. 331–334, XP002090234.

* cited by examiner

Primary Examiner—Nay Maung
Assistant Examiner—Sujatha Sharma
(74) Attorney, Agent, or Firm—Sughrue Mion, PLLC

(57) ABSTRACT

The system comprises transmitters transmitting programs or multimedia data to a satellite, each program being transmitted on an uplink frequency channel, and program multiplexing means onboard the satellite receiving programs and routing them onto a single downlink frequency channel. A configuration station on the ground comprises means for transmitting system data on an uplink frequency channel and configuration means onboard the satellite selectively associate uplink frequency channels and a downlink frequency channel in response to some of the received system data.

10 Claims, 4 Drawing Sheets

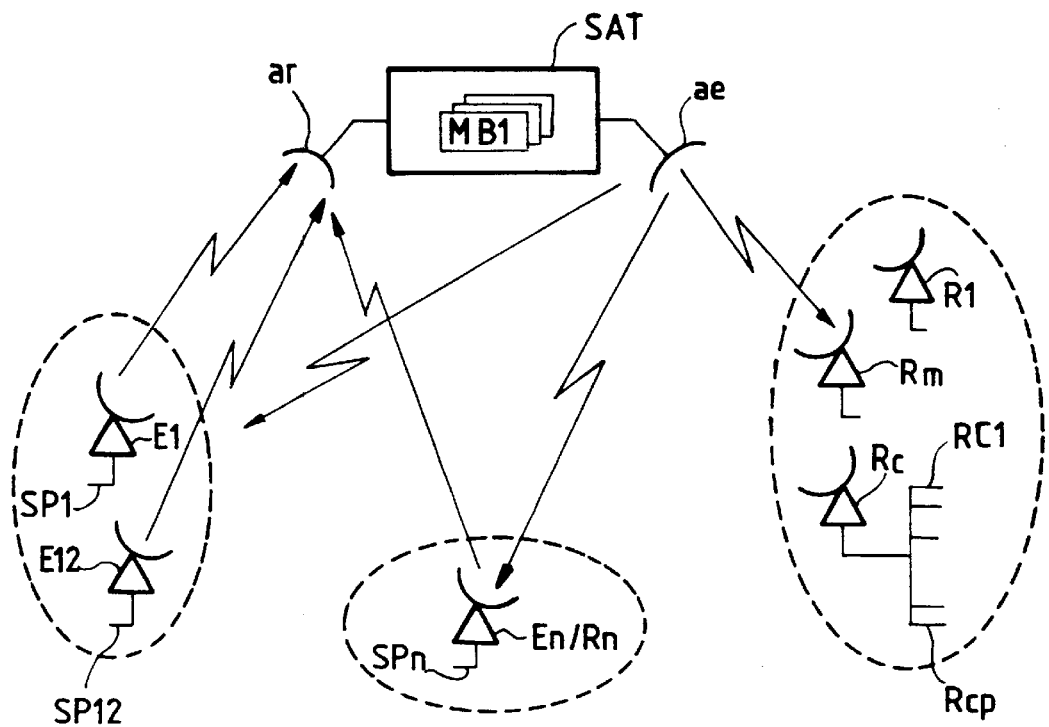
FIG_1
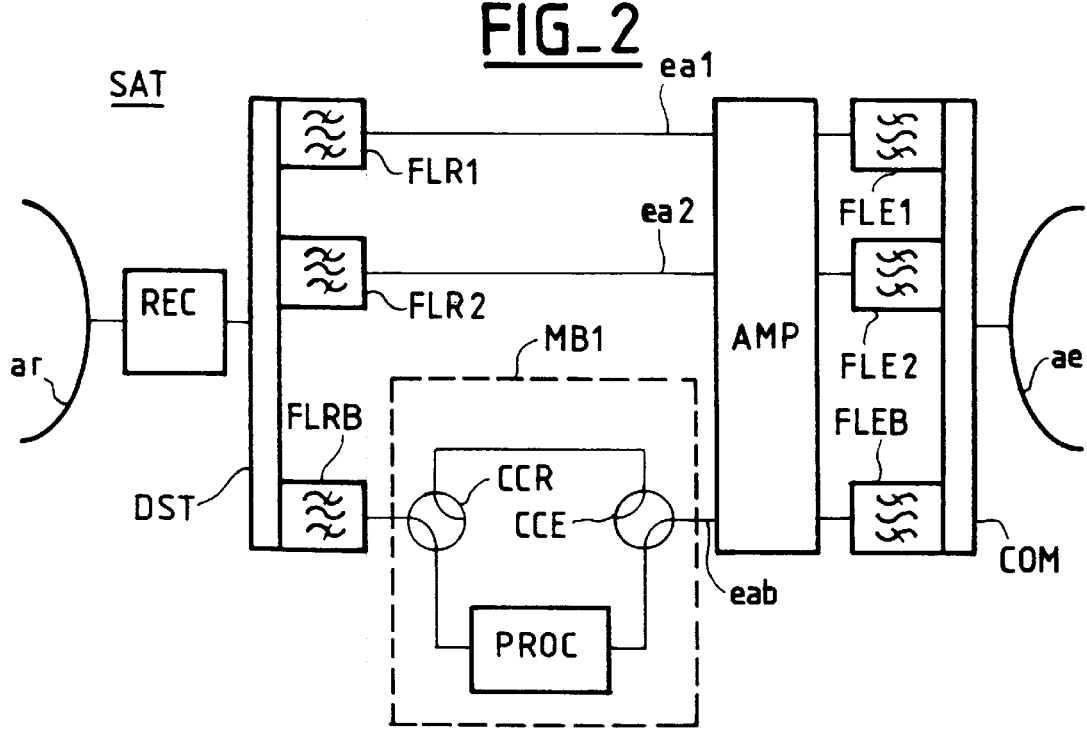
FIG_2

FIG_3
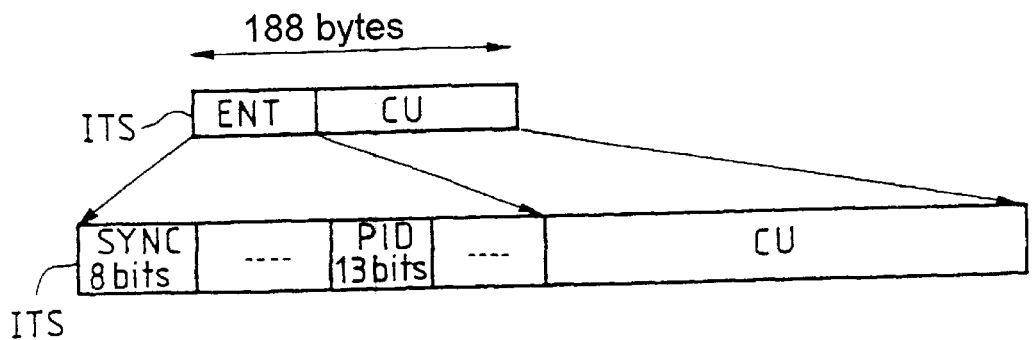
FIG_4
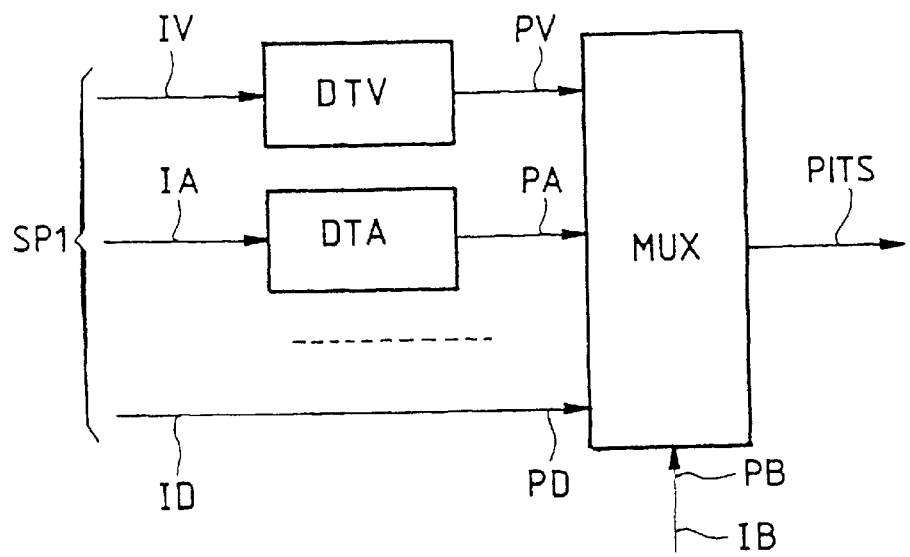

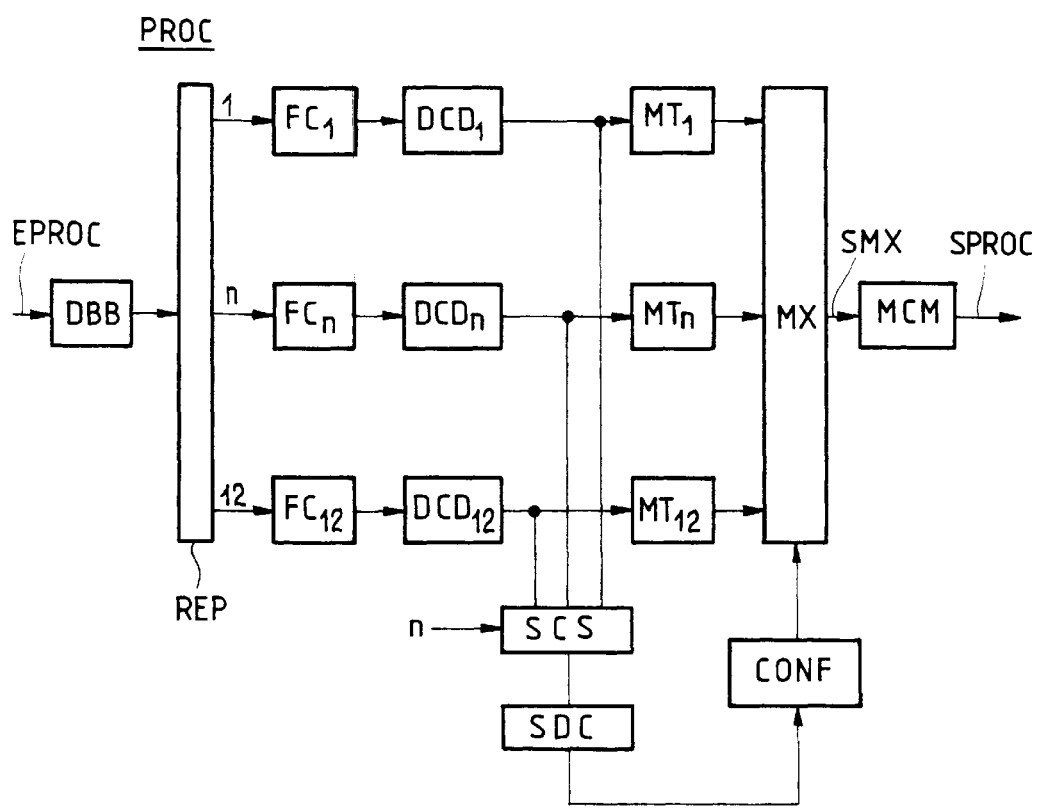
FIG_5
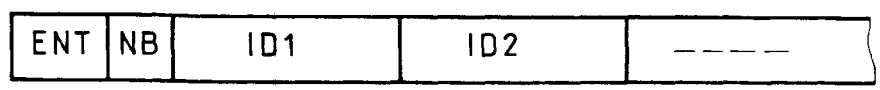
FIG_6

FIG_7
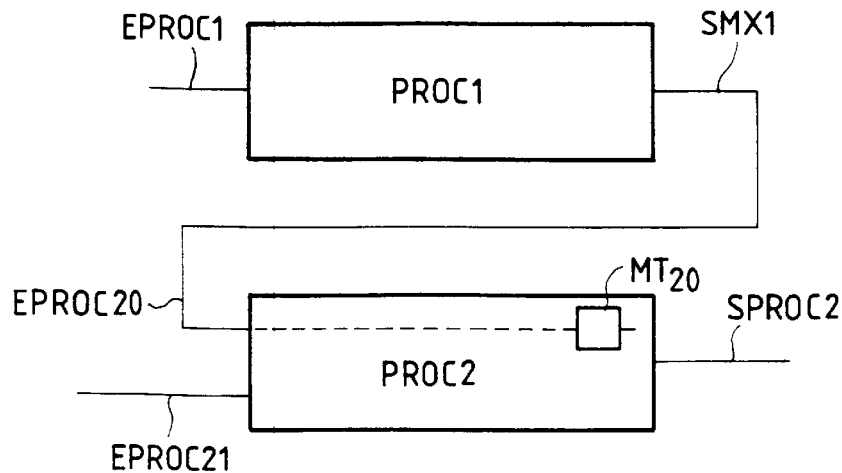
FIG_8
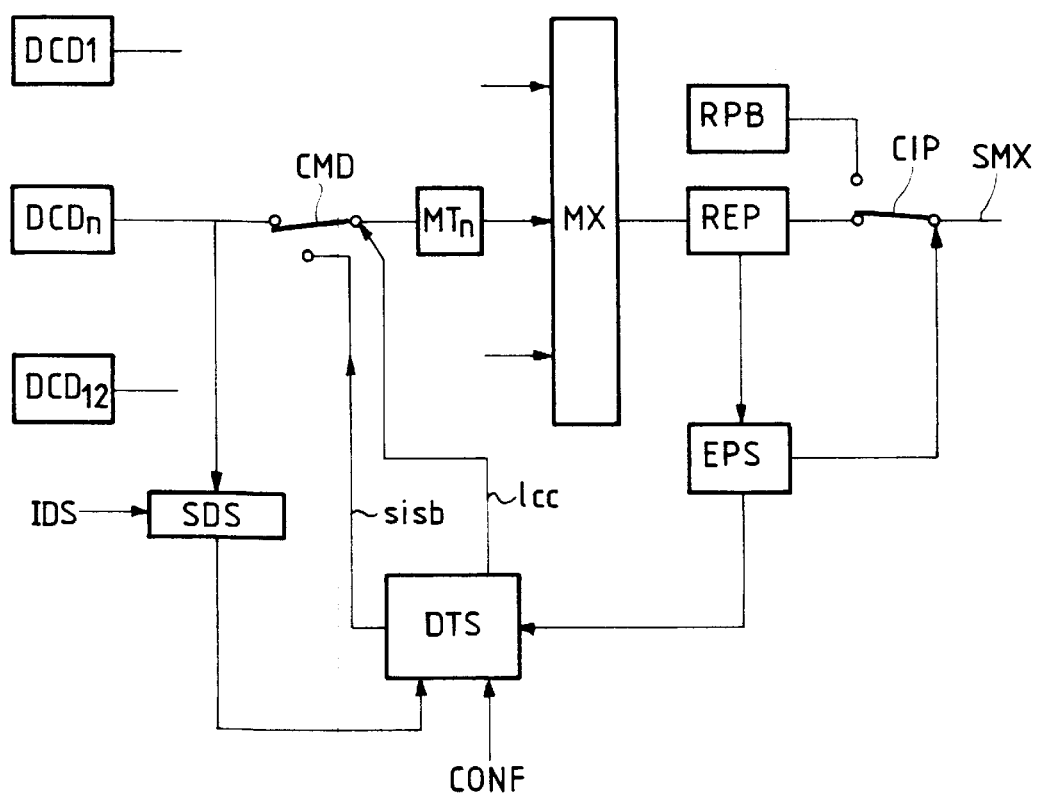

SATELLITE COMMUNICATION SYSTEM FOR BROADCASTING AUDIO-VISUAL PROGRAMS AND MULTIMEDIA DATA

The present invention concerns a satellite communication system for broadcasting audiovisual programs and multimedia data.

BACKGROUND OF THE INVENTION

French Patent No. 2 723 279 describes a communication system of the above type comprising a plurality of transmitters, each of which transmits a transmit signal carrying a television program, and a satellite comprising a multiplexer combining said transmit signals to form a transmit multiplex that is broadcast to users' receivers on a downlink frequency channel.

To be more precise, a transmit signal comprises an audio signal, a video signal and optionally data. The audio and video signals can be encoded to the MPEG-2 (Moving Picture Expert Group No. 2) standard, which is well known in the art (ISO/IEC Standard 13 818). The transmit signal, structured into transport packets, is transmitted in accordance with the DVB-S (Digital Video Broadcasting by Satellite) standard, which is also well known in the art (ETS 300 421). An MPEG2 transport packet comprises 4 header bytes, 184 payload bytes and optionally 16 redundant bytes for an error correcting code. The transport packets are transmitted on an uplink frequency channel.

In the transmitters of the above system the allocation of uplink frequency channels is fixed or virtually fixed. Onboard the satellite, channels are then selected by filtering using passive components; this filtering is therefore fixed. The multiplexing providing the transmit multiplex is sequential; it is therefore also fixed. A bundle of programs is therefore defined only by allocating frequency channels to the transmitters supplying the programs constituting the bundle of programs.

The drawback of a system of the above kind is that the television program broadcast operator is dependent on the program sources and the transmitters for composing its bundle of programs. This is inflexible and gives rise to additional operating costs.

A similar problem arises with service and information data (SI data), also defined by the standard mentioned above, and part of which comprises data transmitted to users to enable them to exploit the transmit multiplex. Of course, SI data of the above kind can be combined in a station and supplied to a transmitter as a particular program to be broadcast. This requires dedicated resources, in addition to program control resources, which represents additional constraints and costs that it would be desirable to limit.

OBJECTS AND SUMMARY OF THE INVENTION

The invention provides a simpler and less costly solution to these problems.

The satellite communication system in accordance with the invention for broadcasting audiovisual programs and multimedia data comprises:

in at least two ground stations, means for transmitting programs to a satellite, each program being transmitted on an uplink frequency channel, on a satellite, program multiplexing means receiving at least two of said programs and routing them onto a single downlink frequency channel, in a configuration station on the ground, system data transmission means, said data being transmitted on at least one uplink frequency channel, onboard the satellite, means for receiving such system data associated with said at least one uplink frequency channel, and onboard the satellite, configuration means for selectively associating uplink frequency channels and one downlink frequency channel in response to at least some of said system data received by said receive means, the latter data constituting configuration data.

In one embodiment said system data is transmitted in the form of a program dedicated to that purpose and thus inserted into an uplink frequency channel dedicated to that program.

In one embodiment of the invention said configuration means comprise means for selecting said received configuration data and configuration control means for determining accordingly to use the received configuration.

If said configuration means essentially comprise a multiplexer for multiplexing transport packets from a plurality of uplink frequency channels, said control means determine the identities of frequency channels of which said multiplexer receives transport packets for multiplexing them on said downlink frequency channel.

According to another feature, said system data comprises service information data retransmitted by the satellite on said downlink frequency channel.

The communication system according to the invention further comprises a service information processor receiving the service information of programs constituting a bundle of programs and compiling said information to constitute program bundle service information which is inserted into a program on said downlink frequency channel.

In one embodiment said service information processor is coupled to an uplink frequency channel to receive thereon configuration information determining the conditions of said compilation of service information.

In one embodiment said service information processor is connected to said downlink frequency channel by extractor means extracting service information packets relating to the programs and replacing them as required with stuffing packets.

BRIEF DESCRIPTION OF THE DRAWINGS

The various objects and features of the present invention will become more clearly apparent in the course of the following description of one embodiment of the invention, which is given by way of non-limiting example and with reference to the accompanying drawings, in which:

FIG. 1 is a general diagram of a communication system in accordance with the invention, FIG. 2 shows one embodiment of a satellite SAT from FIG. 1, FIG. 3 shows the format of packets transmitted in the communication system from FIG. 1, FIG. 4 shows one embodiment of a transmitter such as the transmitter E1 of the communication system from FIG. 1, FIG. 5 shows one embodiment of a channel processor PROC of the satellite SAT from FIG. 2, FIG. 6 shows one format of the payload of a configuration packet, FIG. 7 shows a variant of the channel processor from FIG. 5 enabling a bundle of programs to be made up from programs on more than one uplink channel, and FIG. 8 shows a variant of the channel processor from FIG. 5 incorporating arrangements for processing service information SI onboard the satellite.

MORE DETAILED DESCRIPTION

FIG. 1 is a general illustration of the communication system of the invention. The figure shows program sources SP1, SP12 connected to transmitters E1, E12 whose antennas transmit to a satellite SAT. The corresponding signals are received by a receive antenna ar onboard the satellite SAT, onboard which at least one multiplexing system MB1 combines the signals received in this way to form a transmit signal supplied to a transmit antenna ae and transmitted to receivers R, Rm, Rc.

The number of programs SP1, SP12 varies with the application and with time for the same application. Each transmitter E1, E12 transmits the programs on an uplink frequency channel exclusively allocated to it. The multiplexing system MB1 demodulates various uplink frequency channels and decodes the program signals carried by each of them. It multiplexes the resulting signals to form a multiplexed signal containing a bundle of programs which is encoded and modulates a downlink frequency channel carrier. The bandwidth of the downlink frequency channel is of course sufficient to accommodate all the program signals obtained from the uplink frequency channels. Each receiver R, Rm, Rc receives the downlink frequency channel and exploits its content. The receivers R1, Rm are receivers of individual users and are adapted to select a program and display it on the screen of a television, for example. The receiver Rc represents the head end receiver of a distribution network serving multiple users Rc1, Rcp.

To what has just been described the invention adds a source Spn of system data coupled to a transmitter En whose antenna transmits the system data to the satellite SAT. The transmitter En is associated with a receiver Rn which receives from the satellite SAT the downlink frequency channel previously described. The essential function of this receiver is to monitor what the satellite SAT is broadcasting.

The system data Spn includes configuration data transmitted to the satellite SAT. Onboard the satellite, which is adapted to intercept and to exploit such data, in a manner described below, the configuration data determines, among other things, which uplink frequency channels must be multiplexed to compose the bundle of programs. The program broadcast operator can therefore control the composition of the bundle of programs without the assistance of intermediaries. The receiver Rn is used to monitor the effects of such configuration commands.

What has just been described concerns a bundle of programs, of course. The same satellite SAT can process in a similar fashion one or more other bundles of programs occupying different frequency bands or one or more streams of multimedia data. It can treat, in a simpler way, bundles of programs composed on the ground; in this case the satellite is merely a repeater. Finally, and again acting as a simple repeater, it can process high bit rate transmission links other than bundles of programs.

The diagram in FIG. 2 is an illustration of this and shows in a general but more detailed way the equipment of the satellite SAT from FIG. 1. It shows the receive antenna ar, the transmit antenna ae and the multiplexing system MB1.

To be more precise, the signal picked up by the receive antenna ar is received by a receiver REC and fed to a distributor DST which splits it between receive connection filters FLR1, FLR2, FLRB. Each filter selects a receive link, i.e. a frequency band wide enough to contain the uplink frequency channels described with reference to FIG. 1. To be more precise, the filter FLRB selects the frequency band containing these frequency channels. With the switch CCR in the position shown, the frequency band in question is supplied to a channel processor PROC whose function is as described above in the description of the multiplexing system MB1. This processor therefore produces a downlink frequency channel signal which is fed to an input eab of an amplifier system AMP when the switch CCE is in the position shown.

Setting the switches CCR and CCE to their other position (by a quarter-turn rotation) connects the output of the filter FLRB directly to the input eab of the amplifier system AMP. This switch setting is for bundles of programs composed on the ground and transmitted on a broadband uplink frequency channel.

The outputs of the filters FLR1 and FLR2 are permanently connected direct to corresponding inputs ea1 and ea2 of the amplifier system AMP. As mentioned above, these are broadband links for which the satellite SAT merely acts as a repeater.

The amplified input signals ea1, ea2, eab are fed in that order to transmit link filters FLE1, FLE2, FLEB whose outputs drive the transmit antenna ae via a combiner COM.

FIG. 3 shows the signals transported by the uplink and downlink frequency channels described with reference to FIG. 1 in the case of MPEG-2 type transmission. These signals form packets ITS of 188 bytes comprising a header ENT and a payload CU to which 16 redundant-bytes can be added for an optional error correcting code, as already mentioned. The bottom line shows that the header comprises a program indicator PID on 13 bits after a synchronization byte SYNC and other data that is not relevant here. Thus the downlink frequency channel, carrying packets with different PID, conveys as many different programs. The same system is applied to the uplink frequency channels (see below).

FIG. 4 shows one embodiment of a transmitter like the transmitter E1 from FIG. 1. The program information SP1 comprises video information IV, audio information IA and data information ID. The video information IV is processed in accordance with the MPEG-2 standard in a video processor DTV which produces packets PV conforming to the FIG. 3 format. These packets are collectively identified by an indicator PID allocated to them. Similarly, the audio information IA is processed according to the MPEG-2 standard in an audio processor DTA which produces packets PA to the FIG. 3 format with another indicator PID. The data signal ID also conforms to the FIG. 3 format. It contains data accompanying the program SP1, for example, with another indicator PID. Stuffing information IB is also available in the FIG. 3 format. It conforms to an easily identifiable format. A packet multiplexer MUX cyclically samples a packet PV, PA, PD or PB, in that order. If a packet PV is available it is transmitted as such in a stream of packets PITS. After channel encoding, this packet modulates the carrier of the frequency channel. If there is no packet PV, an available packet PA is transmitted; if there is none, an available packet PD is transmitted; if there is none, a stuffing packet PB is transmitted.

The situation is similar to what has just been described with reference to FIG. 4 in the case of the transmitter en from FIG. 1 except the video information IV and the audio information IA may be absent, in which case the processors DTV and DTA can be dispensed with and the multiplexer MUX can be simplified. This is not mandatory, and in fact depends on the respective bit rates of the information IV, IA and ID relative to the global bit rate of the packets PITS that the frequency channel can handle.

One embodiment of the channel processor PROC of the satellite SAT from FIG. 2 will now be described with reference to FIG. 5. It has an uplink input EPROC corresponding to the lower output from the receive switch CCR in FIG. 2 and connected to the output of the receive link filter FLRB. The signal at this input, comprising 12 adjacent frequency channels in an uplink frequency band of 36 MHz selected by the filter FLRB (FIG. 2), for example, is first amplified and transposed to the baseband in a front end module DBB and then drives a distributor REP which splits it equally between 12 channel filters $FC_1$, $FC_n$, $FC_{12}$ each driving a demodulator and decoder $DCD_1$, $DCD_n$, $DCD_{12}$ each of which restores a corresponding program signal SP1, SPn, SP12 in the form of packets like that shown in FIG. 3. These packets are written into corresponding buffers $MT_1$, $MT_n$, $MT_{12}$ for retransmission within a bundle of programs composed by a multiplexer MX whose output SMX is connected to an encoder and modulator system MCM delivering the downlink signal, also in a 36 MHz frequency band, at the output SPROC connected to the lower port of the transmit switch CCE (see FIG. 2) and consequently to an input of the amplifier system AMP for transmission via the antenna ae of the satellite SAT.

The channel processor additionally comprises configuration means for selectively associating some uplink frequency channels with the downlink frequency channels. These means comprise a system channel selector SCS receiving a channel identifier n which can be a constant of the communication system or a parameter transmitted on the telemetry/telecontrol channel or by any other means. The selector SCS selects the packets of one of the frequency channels, here channel n, supplied by the demodulator-decoder DCDn, and transmits them to a configuration packet selector SDC which exploits information contained in the payload of these packets.

The payload of a configuration packet in FIG. 6 comprises a header ENT, an indicator NB giving the number of programs constituting the bundle and a series of program indicators ID1, ID2, etc. identifying and defining programs individually. A plurality of configuration packets like that from FIG. 6 may be needed to convey all the configuration information for a bundle of programs. The configuration packet selector SDC recognizes the particular value of the indicator PID identifying a packet carrying configuration information. It then stores the content of such packets, restores the indicators NB, ID1, ID2, etc. constituting complete configuration information and transmits the indicators to the configuration controller CONF which exploits them to control the multiplexer MX so that the latter collects and transmits to the output SPROC packets supplied by the demodulator-decoders $DCD_1$, $DCD_2$, etc.

As is made clear below, in the description relating to FIG. 8, additional means can be provided to advise users of the configuration applied and/or applicable.

It is therefore sufficient for the program operator to include in the programs Spn packets like those just described for the bundle of programs to be made up in accordance with their requirements. They can change it as easily as this without intervention by the program transmitters or the satellite operator.

The arrangements just described can be varied in many ways, of course. In particular, the transmission formats are given by way of example only. ATM type cells could be transmitted instead of the transmit packets described or such packets could be contained within the payload of such cells. The system channel selector is not indispensable if the system channel identifier is a constant of the communication system. The system channel has been shown as a program channel, which can provide program packets transmitted to the buffer $MT_n$ and, where the configuration provides for this, route them via the multiplexer MX to the output SPROC. In this case, an additional connection between the configuration packet selector SDC and the buffer $MT_n$ could usefully prevent the storage of a configuration packet in the buffer and its transmission in the bundle of programs, where it has no place. However, as will become apparent hereinafter, an alternative is to allocate the entire channel to transmitting system information, in other words to use it as a service channel. In this case the connection $DCD_n$-$MT_n$ would not exist.

FIG. 7 shows another variant. It consists in composing a bundle of programs from more than one uplink frequency channel.

A first uplink channel is allocated a channel processor PROC1 onboard the satellite whose input EPROC1 is similar to the input EPROC of the processor from FIG. 5 but whose output SMX1 is similar to the output SMX of the multiplexer MX from FIG. 5. It supplies multiplexed packets to an input EPROC20 of a second channel processor PROC2 having an input EPROC21 similar to the input EPROC of the processor from FIG. 5 and whose output SPROC2 is similar to the output SPROC of the channel processor PROC from FIG. 5. In the channel processor PROC2, as already mentioned, the input EPROC20 is connected directly to a buffer MT20 so that packets assembled in the channel processor PROC1 from uplink frequency channels selected on the input connection EPROC1, as described with reference to FIG. 5, are processed as packets of other frequency channels which are also selected from frequency channels of the input connection EPROC21, but here in channel processor PROC2. Generalizing this, a bundle of programs can therefore be constituted from a plurality of uplink frequency channels.

Another aspect of the present invention concerned with service information (SI) will now be considered. The MPEG-2 and DVB-SI standards provide for an audiovisual program to include service information incorporated in data transmitted in certain program packets identified by a particular PID, over and above video and audio information (see description with reference to FIG. 4). This service information includes tables PAT, PMT, CAT, NIT (see the standard for more details) which define the program transmitted and which are needed for exploiting the information transmitted in the packets of the program.

In the embodiment described with reference to FIG. 5, it is implicit that the programs are transmitted as originally composed. The bundle concept is not relevant to the service information.

However, and still with reference to the FIG. 5 embodiment, it is equally possible for the service information from a plurality of program sources constituting a bundle of programs to be combined in a ground station or to be compiled to supply program bundle service information and compose a stream of program packets SPn, for example. The satellite from FIG. 5 transmits such program bundle service information like a program of the bundle of programs, in the manner previously described. The same objection might be raised in this regard as that concerning composing the bundle of programs on the ground, which requires ground links for this particular purpose, which is costly. It is therefore desirable to dispense with such links.

FIG. 8 shows modifications to the satellite from FIG. 5 to enable program bundle service information to be constituted onboard the satellite, in the same manner as it is constituted on the ground, but without requiring ground links for this purpose.

For simplicity, FIG. 8 shows only some of the units already described from FIG. 5, namely units $DCD_1$, $DCD_n$, $DCD_{12}$, $MT_n$., MX. The channel multiplexer from FIG. 8 also comprises the other units from FIG. 5, of course, with exactly the same structure and function. Assuming that additional switches CMD and CIP are in the position shown, the channel multiplexer from FIG. 8 operates in exactly the same way as that from FIG. 5, a packet examination register REP inserted upstream of the output SMX merely introducing a time-delay into transmission of the downlink signal.

However, the channel multiplexor from FIG. 8 also comprises a service control packet selector SDS which receives a packet identifier IDS and selects certain packets in order to transmit them to a service information processor DTS. The packet examination register REP connected to a service information packet extractor EPS, which reads the downlink packets, recognizes the service information packets for the various programs, routes them to the service information processor DTS, if it is active, and then operates the packet interceptor switch CIP which replaces the packet routed in this way with a stuffing packet supplied by a stuffing packet register RPB. The switch CIP then returns to the position shown and transmission of program packets resumes.

The service information processor therefore receives configuration information for processing the service information selected by the selector SDS from the program SPn (see FIG. 1) on the uplink channel dedicated to it. It receives packets containing service information for all the programs of the bundle of programs composed onboard the satellite via the service information packet extractor EPS, as described with reference to FIG. 5. In accordance with the configuration information, it compiles the resulting program service information into program bundle service information it supplies to an output sisb. In parallel with this, and via a switch control link, the processor DTS changes the setting of the switch CMD so that the program bundle service information packets supplied on the link sisb are transmitted to the buffer $MT_n$ and consequently transmitted on a downlink transmission channel allocated in this way to program bundle service information.

Generally speaking, a processor like the processor DTS, which receives configuration information for processing service information in system data from an uplink channel and is connected to downlink channels, can transfer to the satellite functions which would require ground links to a processor station if implemented on the ground before transmission to the satellite. This is a flexible and economic solution.

Similarly, and as indicated by a connecting arrow CONF, the processor DTS can also be adapted to receive program bundle configuration information from the configuration controller CONF and to retransmit such information in a program bundle configuration service information packet transmitted on the link sisb and broadcast via the multiplexer MX, exactly like the program bundle service information packets referred to in the previous paragraph.

What is claimed is:

1. A satellite communication system for broadcasting audiovisual programs and multimedia data, comprising:

in at least two ground stations, means for transmitting programs to a satellite, each program being transmitted on an uplink frequency channel, onboard a satellite, program multiplexing means receiving at least two of said programs and routing them onto a single downlink frequency channel, in a configuration station on the ground, system data transmission means, said system data being transmitted on at least one uplink frequency channel, onboard the satellite, means for receiving such system data associated with said at least one uplink frequency channel; and onboard the satellite, configuration means for selectively associating uplink frequency channels and one downlink frequency channel in response to at least some of said system data received by said receiving means, the latter data constituting configuration data, wherein said configuration means comprise means for selecting said received configuration data and configuration control means for determining accordingly to use the received configuration, and wherein said configuration means comprise a multiplexer for multiplexing transport packets from a plurality of uplink frequency channels and said control means determine the identities of frequency channels of which said multiplexer receives transport packets for multiplexing them on said downlink frequency channel.

2. A communication system according to claim 1, wherein said system data is transmitted in the form of a program dedicated to that purpose and thus inserted into an uplink frequency channel dedicated to that program.

3. A communication system according to claim 1, wherein said configuration control means insert packets transporting configuration information applied and applicable to the status of said receive means via said multiplexer.

4. The communication system according to claim 1, based on the MPEG-2 (ISO/IEC 13 818) and DVB-S (ETS 300 421) international standards for all matters related to multiplexing, framing, channel coding, modulation and service information.

5. A communication system according to claim 1, wherein said system data comprises service information data retransmitted by the satellite on said downlink frequency channel.

6. A satellite communication system for broadcasting audiovisual programs and multimedia data, comprising:

in at least two ground stations, means for transmitting programs to a satellite, each program being transmitted on an uplink frequency channel, onboard a satellite, program multiplexing means receiving at least two of said programs and routing them onto a single downlink frequency channel, in a configuration station on the ground, system data transmission means, said system data being transmitted on at least one uplink frequency channel, onboard the satellite, means for receiving such system data associated with said at least one uplink frequency channel, onboard the satellite, configuration means for selectively associating uplink frequency channels and one downlink frequency channel in response to at least some of said system data received by said receiving means, the latter data constituting configuration data, and onboard the satellite, a service information processor receiving the service information of programs constituting a bundle of programs and compiling said information to constitute program bundle service information which is inserted into a program on said downlink frequency channel.

7. A communication system according to claim 6, wherein said service information processor is coupled to an uplink frequency channel to receive thereon configuration information determining the conditions of said compilation of service information.

8. A communication system according to claim 6, wherein said service information processor is connected to said downlink frequency channel by extractor means extracting service information packets relating to the programs and replacing them as required with stuffing packets.

9. A communication system according to claim 6, wherein said service information processor is connected to said downlink frequency channel by extractor means extracting from the program channels service information packets relating to the programs and inserting into a service channel service information packets relating to the bundle of programs constituted by compiling said service information relating to the programs.

10. The communication system according to claim 6, based on the MPEG-2 (ISO/IEC 13 818) and DVB-S (ETS 300 421) international standards for all matters related to multiplexing, framing, channel coding, modulation and service information.

* * * * *